United States Patent
Konishi et al.

(10) Patent No.: US 10,208,408 B2
(45) Date of Patent: Feb. 19, 2019

(54) METHOD FOR MANUFACTURING ULTRAFINE FIBER

(71) Applicant: JX Nippon Oil & Energy Corporation, Tokyo (JP)

(72) Inventors: Hiroaki Konishi, Tokyo (JP); Atsuo Omaru, Tokyo (JP); Taku Ichibayashi, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 176 days.

(21) Appl. No.: 15/126,077

(22) PCT Filed: Mar. 6, 2015

(86) PCT No.: PCT/JP2015/005662
§ 371 (c)(1),
(2) Date: Sep. 14, 2016

(87) PCT Pub. No.: WO2015/141495
PCT Pub. Date: Sep. 24, 2015

(65) Prior Publication Data
US 2017/0088980 A1    Mar. 30, 2017

(30) Foreign Application Priority Data
Mar. 19, 2014 (JP) .................. 2014-055821

(51) Int. Cl.
*D02J 1/22* (2006.01)
*D06M 10/00* (2006.01)
(Continued)

(52) U.S. Cl.
CPC ............ *D02J 1/22* (2013.01); *B29C 35/0805* (2013.01); *B29C 55/30* (2013.01); *D02J 1/222* (2013.01);
(Continued)

(58) Field of Classification Search
CPC .... B29C 2035/0838; B29C 55/30; D02J 1/22; D02J 1/222; D06M 10/005
(Continued)

(56) References Cited

U.S. PATENT DOCUMENTS

| 2006/0006585 A1 | 1/2006 | Suzuki |
| 2010/0148406 A1 | 6/2010 | Suzuki |
| 2013/0065133 A1 | 3/2013 | Suzuki et al. |

FOREIGN PATENT DOCUMENTS

| JP | 3534108 B2 | 6/2004 |
| JP | 2010185162 A | 8/2010 |

(Continued)

OTHER PUBLICATIONS

Int'l Search Report dated Apr. 21, 2015 in Int'l Application No. PCT/JP2015/056632.

*Primary Examiner* — Leo B Tentoni
(74) *Attorney, Agent, or Firm* — Panitch Schwarze Belisario & Nadel LLP (57) ABSTRACT

A method for manufacturing ultrafine fibers having an average diameter of less than 1 μm is implemented by an apparatus including a feeder and a drawing chamber in communication with the feeder via an orifice having a pressure difference. The method includes introducing a multifilament to the drawing chamber under the condition that the ratio of the cross-section of the multifilament to the cross-section of the orifice rectifier is 50% or less, and irradiating the discharged multifilament such that the center of the multifilament melted thereby is located 1 to 15 mm apart vertically below the orifice outlet to melt the leading portion of the multifilament and cause the multifilament to swing at a maximum angle of 5 to 80 degrees to the central orifice axis within a conical space, such that the melted (Continued)

leading portion of the multifilament is drawn by an air stream generated by the pressure difference.

5 Claims, 2 Drawing Sheets

(51) Int. Cl.
  *B29C 35/08*   (2006.01)
  *B29C 55/30*   (2006.01)
  *B29K 623/00*  (2006.01)
  *B29K 701/12*  (2006.01)
  *B29L 31/00*   (2006.01)
(52) U.S. Cl.
  CPC ... *D06M 10/005* (2013.01); *B29C 2035/0838* (2013.01); *B29K 2623/12* (2013.01); *B29K 2701/12* (2013.01); *B29L 2031/731* (2013.01)
(58) Field of Classification Search
  USPC .... 264/210.2, 210.8, 288.4, 290.5, 479, 482
  See application file for complete search history.

(56) References Cited

FOREIGN PATENT DOCUMENTS

| | | |
|---|---|---|
| WO | 2008084797 A1 | 7/2008 |
| WO | 2011136133 A1 | 11/2011 |

METHOD FOR MANUFACTURING ULTRAFINE FIBER

CROSS-REFERENCE TO RELATED APPLICATION

This application is a Section 371 of International Application No. PCT/JP2015/056632, filed Mar. 6, 2015, which was published in the Japanese language on Sep. 24, 2015, under International Publication No. WO 2015/141495 A1, and the disclosure of which is incorporated herein by reference.

TECHNICAL FIELD

The present invention relates to a method for manufacturing ultrafine fibers. More Specifically, the present invention relates to a method for manufacturing ultrafine fibers with an average fiber diameter of less than 1 μm through irradiation of a multifilament with a laser beam to partially melt the multifilament and then drawing of the melted portion in a subsonic to supersonic air stream, and a non-woven fabric comprising ultrafine fibers prepared by the method.

BACKGROUND ART

In recent years, ultrathin fibers called nanofibers with a diameter of less than 1 μm have received attention.

Nanofibers are unique materials that have functions derived from nanoscale diameters and ease of handling derived from macroscale lengths. Typical characteristics of nanofibers include (1) large specific surface area (ultra-specific surface area effect), (2) nanoscale size (nano-size effect), and (3) molecular orientation in fibers (molecular orientation effect).

Many methods for producing nanofibers have been proposed. Mainly known are electrospinning, melt-blow, and island-in-sea melt spinning methods.

The electrospinning method involves application of a high voltage of several tens of kilovolts to a diluted resin solution to scatter the solution by the force of the electric field and to volatilize the solvent simultaneously to form fibers. In this method, the resin should be soluble in any solvent. In addition, the method requires very severe conditions on preparation of the solution and operational parameters, such as temperature, humidity, and electric field. Use of high voltage poses a safety problem in use of organic solvents and a problem on recovery of the solvents. Another disadvantage is low productivity due to use of diluted solutions.

The melt-blow method is a common process for manufacturing non-woven fabrics, which are produced in commercial scales by several companies, for example, Asahi Kasei Corporation and Toray Industries, Inc. Although the melt-blow method is commonly used for producing non-woven fabrics, a reduced volume of resin should be discharged from a nozzle with a small diameter to produce nanofibers by this method. As a result, nanofibers can be produced with significantly low productivity. In addition, usable resins are limited to special grades with low viscosity.

The island-sea melt spinning method involves producing sea-island conjugated yarns each having several tens of to several hundred islands in the sea with a spinet that can dispose a large number of island polymer segments in the sea polymer and removing the sea polymer with a solvent to produce ultrafine fibers consisting of the island polymer. The island-sea melt spinning method has disadvantages, such as high process cost for dissolution of the sea component and low productivity. Furthermore, compatibility between the sea component and the island component having different properties should be carefully considered, and usable resins are limited.

Several methods other than the above-described three methods have been developed. One of them is a carbon dioxide supersonic laser drawing method (Patent Literatures 1 and 2). This method involves irradiating fibers with laser beams in a subsonic to supersonic air stream to partially melt fibers and then drawing the melted fibers by the high-rate air stream.

The carbon dioxide supersonic laser drawing method is characterized in that (1) any thermoplastic polymer material can be applied; (2) the resulting nanofibers have infinite length; (3) the fibers are highly oriented; (4) since no solvent is used, the working environment and the resulting nanofibers are provided with high safeness; (5) since fibers are collected under reduced pressure, nanofibers are not scattered; and (6) since the device has a simple compact structure, it can be placed at any site and is excellent in scalability.

However, the greatest disadvantage of the carbon dioxide supersonic laser drawing method is low productivity, as with other methods for producing nanofibers. Since the air stream derived from vacuum has a limited flow rate, the volume of the resin convertible into nanofibers per unit hour is limited for each nozzle. The material balance between the volume of fed original yarn and the weight of produced nanofibers is represented by the expression: (weight of original yarn)×(feeding rate of original yarn)=weight of nanofibers. According to Examples in Patent Literature 1, the productivity is low, that is, original yarns with a diameter of about 100 to about 200 μm can be fed at a low rate of 0.1 to 1 m/min. The present inventors have also conducted some investigations for further improvement in productivity; however, the productivity was 2.0 m/min at most for original yarns with a diameter of about 100 μm. A higher production rate causes defects such as shot beads and a large diameter of several or larger micrometers of fine fibers, which cannot be named nanofibers. The material balance in volume of original yarn is represented by expression: (radius of original yarn)$^2$×(feeding rate of original yarn)×(radius of nanofiber)$^2$×(air stream rate). In general, fibers that can be referred to as nanofibers are those having a diameter of 500 nm or less. A combination of atmospheric pressure and reduced pressure disclosed in Patent Literature 1 (for example, Examples) can achieve only a limited air stream rate. The expression also demonstrates the limitation of the product, (radius of original yarn)$^2$×(feeding rate of original yarn), i.e., processable volume of original yarn.

Another disadvantage is poor uniformity. As a single fiber can he produced through one orifice in this method, a significantly increased number of nozzles are required for production of a uniform non-woven fabric. However, the number of orifice cannot be readily increased because an increased number of orifices leads to an increase in the number of original yarns, requiring a larger device. In such a circumference, a large number of original yarns cannot be precisely handled. The increased number of original yarns requires complicated designing of the laser optical system and an increased number of laser oscillators. Furthermore, a large number of orifices lead to a large volume of air flow into the device, precluding control of the air flow in the device. The power of the pump should also be enhanced to keep the reduced pressure in the system. Therefore, the number of orifices are not easily increased due to these restrictions.

CITATION LIST

Patent Literature

Patent Literature 1: WO2003/084797
Patent Literature 2: Japanese Patent No. 3534108

SUMMARY OF INVENTION

Technical Problem

An object of the present invention is to develop a technique that can radically solve problems of conventional carbon dioxide supersonic laser drawing methods and has superior productivity and uniformity by manufacturing ultrafine fibers from a multifilament.

Solution to Problem

The present invention has been accomplished as the result of extensive research and sturdy carried out to solve the problems described above.

That is, the present invention provides a method for manufacturing ultrafine fibers having an average fiber diameter of less than 1 μm with an apparatus including a feeder of an original filament and a drawing chamber in communication with the feeder via an orifice having an inlet and an outlet, the orifice having a pressure difference of 20 kPa or greater between the inlet and outlet by irradiating the original filament introduced from the orifice to the drawing chamber with a laser beam, comprising: introducing the original filament comprising a multifilament of a bundle of 10 or more monofilament to the drawing chamber under such a condition that the ratio S2/S1 of the total cross section S2 of the multifilament to the cross section S1 of the rectifier of the orifice is 50% or less; and irradiating the multifilament discharged from the orifice with a laser beam such that the center portion of the multifilament melted thereby is located 1 mm to 15 mm apart vertically below the outlet of the orifice to melt the leading portion of the multifilament and to cause the entire multifilament to swing at random at a maximum angle of 5 degrees to 80 degrees to the central axis of the orifice within a conical space with the apex defined by the orifice port such that the melted leading portion of the multifilament is drawn by an air stream generated by the pressure difference.

The present invention also provides a non-woven fabric comprising ultrafine fibers produced by the foregoing method.

Although known patent literatures such as Patent Literature 1 refer to multifilament, ultrafine fibers cannot be produced by mere replacement of the monofilament described in Examples in Patent Literature 1 with a multifilament. Since Patent Literature 1 describes irradiating the center of the filament with a laser beam, it evidently aims at using a multifilament in a stationary state, like a monofilament. Since the multifilament in the present invention is swung at random at a maximum angle of the center of the multifilament of 5 degrees to 80 degrees to a vertical line from the orifice within a conical space with the apex defined by the orifice port, (hereinafter, the state where multifilament is swung at random within the conical space is expressed as "vibration"), the center of the filament is not always irradiated with the laser beam. Ultrafine fibers having an average diameter of less than 1 μm (hereinafter may also be referred to as "nanofibers") can be produced from a multifilament only when the conditions defined in the present invention are satisfied. In the present invention, the nanofibers are produced in an environment resembling conventional carbon dioxide supersonic laser drawing methods; however, it is ultimately important to vibrate a multifilament, which makes the present invention different in principle to produce nanofibers from the conventional techniques.

Advantageous Effects

The method of the present invention uses a multifilament that provides multiple origins for making nanofibers and can produce nanofibers from the multifilament at high productivity. According to the method, a large number of nanofibers is generated from one orifice and is blown at random by vibration of the multifilament, resulting in production of an ultrafine non-woven fabric having significantly high uniformity with a reduced number of orifices.

The present invention will now be described in detail.
In the present invention, the original filament to be fed is a multifilament. The multifilament refers to a bundle of multiple multifilament. No particular limitation is imposed on the cross-sectional shape of the monofilaments constituting the multifilament, each of which may have not only a circular cross-sectional shape but also various different cross-sectional shape such as ellipsoidal, tetragonal, trigonal, trapezoidal, or polygonal. The original filament may be a hollow filament or a conjugated filament, such as a core-shell or side-by-side filament. The multifilament constituting the multifilament may be different from each other. The multifilament may consist of monofilaments having different cross-sectional shapes and/or different materials.

The multifilament used in the present invention is a bundle of ten or more multifilament. The number of multifilament to be bundled can be appropriately determined based on the ratio S2/S1 of the total cross section S2 of the multifilament to the cross section S1 of the rectifier of the orifice but is preferably 10 or more, more preferably 20, more preferably 40 or more.

The original filaments of the multifilament used in the present invention preferably each have a diameter in the range of 10 μm to 200 μm.

The multifilament used in the present invention is usually twisted to keep the integrity of the bundle without loosening. The twist pitch is usually 20 times/m or more, and can be appropriately determined based on the number, shape, and material of the monofilament.

Resins suitable for multifilament are thermoplastic resins that can be shaped into filament. Examples of such resins include polyesters such as poly(ethylene terephthalate) and polylactate, polyamides such as nylons (nylon 6 and nylon 66), polyolefins such as polypropylene and polyethylene, polyvinyl alcohol polymers, acrylonitrile polymers, fluorinated polymers such as tetrafluoroethylene-perfluoroalkyl vinyl ether copolymers (PFA), urethane polymers, polyvinyl chloride polymers, styrene polymers, (meth)acrylic polymers, polyoxymethylene, ether-ester polymers, modified cellulose polymers of triacetyl cellulose for example, polyphenylene sulfide polymers, and liquid crystal polymers. Poly(ethylene terephthalate), polylactate, poly(phenylene sulfide), nylons (nylon 6 and nylon 66), and polypropylene are particularly suitable for production of ultrafine fibers by the present invention because they are excellent in stretchability and molecular orientation.

The multifilament usable in the present invention may contain a variety of materials, such as organic compounds, organic metal complexes, and inorganic substances chat may be compounded into or carried on the filament. These compounded or carried materials can be homogeneously dispersed into nanofibers to impart various functions to the nanofibers.

In the present invention, the original filament fed from the filament feeder is drawn. The feeder may be of any type that can feed the filament at a constant rate, for example, nip rolls or a combination of several stages of driving rollers. The original filament fed from the feeder passes through an orifice and is carried by gas flowing in the running direction of the filament through the orifice. The original filament is transferred under a pressure P1 from the filament feeder to the orifice. The space maintained at the pressure PI is referred to as an original filament feeding chamber. In the case where the pressure P1 is atmospheric pressure, no particular enclosure or chamber to maintain the pressure is not needed. In the case where the pressure P1 is higher or lower than atmospheric pressure, an enclosure or chamber to maintain the pressure is needed and a pressure or vacuum pump is also needed. In the present invention, in the case where the pressure is P1 at the inlet of the orifice, the storage section and feeder of the original filament are not always needed to be maintained at the pressure P1. Since it is impractical to dispose these units in separate chambers, these units are preferably be disposed under the same pressure.

The section downstream of the outlet of the orifice is maintained at a pressure P2 lower than P1 and functions as a drawing chamber in which the original filament discharged from the orifice is heated by laser irradiation to be partially melted at its leading portion and drawn. The original filament travels along the air stream in the orifice where the air stream is generated by the difference (P1–P2) between the pressure P1 of the filament feeding chamber and the pressure P2 of the drawing chamber. In the case where the pressure P2 is atmospheric pressure, no particular enclosure or chamber to maintain the pressure is not particularly needed. In the case where the pressure P2 is higher or lower than atmospheric pressure, an enclosure or chamber to maintain the pressure is needed and a pressure or vacuum pump is also needed. Although the relation between pressures P1 and P2 is P1>P2, the relation is preferably P1≥P2, more preferably P1≥3P2, most preferably P1≥5P2. The specific pressure difference (P1–P2) is preferably 20 kPa or greater, more preferably 50 kPa or greater, most preferably 70 kPa or greater.

In the present invention, it is particularly preferred that P2 be reduced pressure (less than atmospheric pressure). This is because P1 may thereby be atmospheric pressure and the reduced pressure P2, which can be achieved by a relatively simple means, enables the apparatus to be simplified. Room temperature air is usually used for P1 and P2. Alternatively, heated air may be used to preheat the original filament or to carry out some heat, treatment for the drawn filament. Inert gas such as nitrogen gas may also be used to prevent oxidation of the filament. Furthermore, water vapor or humid air may be used to prevent release of moisture. In order to control the vibration of the multifilament, other inert gas may also be used.

In the present invention, the original filament feeding chamber is in communication with the drawing chamber via the orifice. In the orifice, the pressure difference (P1>P2) generates a high-rate air stream in the narrow gap between the multifilament and the orifice. In order to generate an air stream at a higher rate, the ratio S2/S1, defined as orifice occupancy, of the total cross section S2 to the cross section of the orifice rectifier S1 should be 50% or less. A large orifice occupancy exceeding 50% leads to insufficient air stream in the orifice. The insufficient air stream cannot cause vibration of the multifilament, which is essential for the present invention, and thus ultrafine fibers cannot be produced. When the multifilament vibrates insufficiently, most of the melted resin fails to be in the form of filament and falls as melted lumps. The optimum orifice occupancy is appropriately determined by several parameters, such as the number, shape, and material of original filaments to form a multifilament. The occupancy should be 50% or less, and is preferably 35 or less. The occupancy is preferably be 5% or more, more preferably 10% or more. An orifice occupancy of less than 5% leads to excess vibration or dispersion of air stream to reduce the air stream force exerted on the multifilament, resulting in a failure to produce high-quality nanofibers.

Figure 1:
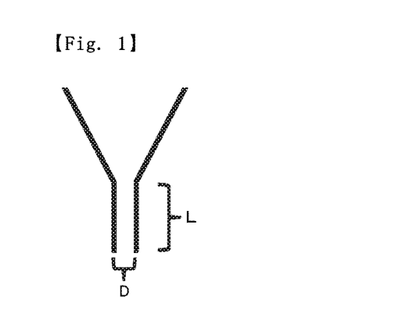
FIG. 1 illustrates the shape of an orifice.

Preferably, the orifice is tapered at the inlet and has a rectifier as shown in FIG. 1. The ratio L/D of the length L to the diameter D of the rectifier is preferably in the range of 0.1 to 100, more preferably 0.5 to 50, more preferably 1 to 10. The shape of the leading edge of the rectifier may be modified to adjust the air stream in view of the number, shape, and material of the original filament used for the multifilament.

Figure 2:
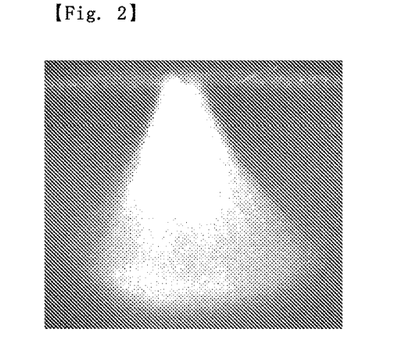
FIG. 2 illustrates a vibrating multifilament.

The multifilament passing through the orifice is irradiated with a laser beam and is melted at its leading portion. The position of laser irradiation, and the shape and power of the laser beam are critical factors for sure vibration of the multifilament. Sure vibration of the multifilament by optimization of these laser parameters is the most important factor for production of nanofibers from a multifilament. FIG. 2 illustrates vibrating multifilament. Since the multifilament vibrates at a significantly high frequency, a residual image as shown in FIG. 2 is visually observed.

Figure 3:
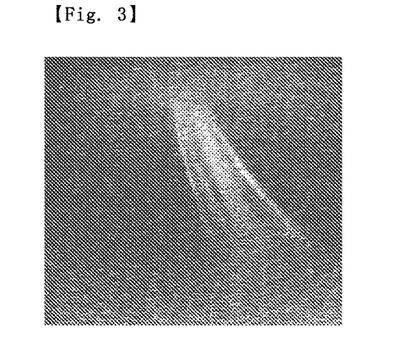
FIG. 3 is a photograph illustrating the state of the vibration taken with a high-speed camera.

The detailed state of the actual vibration was observed with a high-speed camera. As shown in FIG. 3, the multifilament bundle swings together at random within a conical space with an apex defined by the orifice port. The multifilament vibrates irregularly or randomly. In a plan view from the upper face of the orifice port, the multifilament moves at random, i.e., 360 degrees in all the directions.

Figure 4:
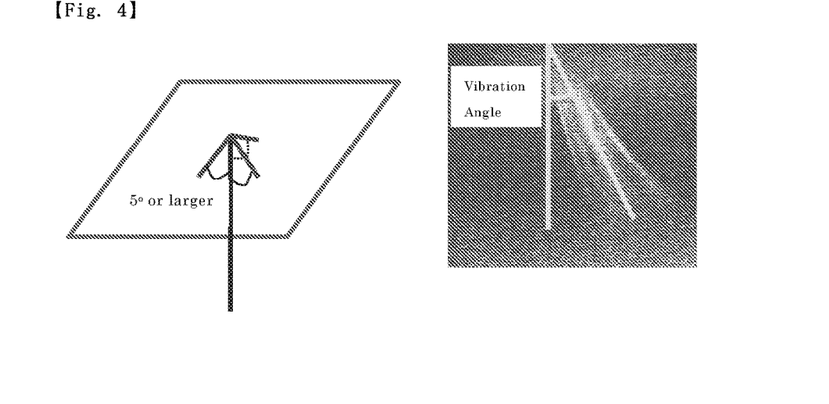
FIG. 4 illustrates the angle of vibration.

In the present invention, it is necessary to cause the multifilament to vibrate by the laser irradiation to produce nanofibers from the multifilament, but mere vibration thereof is not sufficient. The maximum angle of the center of the vibrating multifilament bundle to the perpendicular line from the orifice port (hereinafter referred to as vibration angle) should be 5 degrees or larger (see FIG. 4). Although the vibration angle can be 90 degrees at maximum, a significantly large angle leads to collision of the melted resin with the face of the orifice and thus precludes production of high-quality nanofibers. A significantly small vibration angle cannot generate sufficient vibration. The optimum vibration angle thus ranges from 5 degrees to 30 degrees, preferably 15 degrees to 50 degrees, more preferably 20 degrees to 40 degrees. With a vibration angle outside of this range, nanofibers cannot be produced or even if they are produced, they would be low-quality fibers containing melted lumps called shots or polymer beads of the original yarn resin.

To cause the multifilament to vibrate, the center of the melted portion of the multifilament during the laser irradiation should be at a position of 1 mm or more vertically below the outlet of the orifice. Since the air stream force increases as the distance to the nozzle port decreases, the melted portion if at a position of less than 1 mm from the orifice port causes the maximum angle of the vibrating filament bundle from the perpendicular line to be significantly large, for example, 90 degrees in some cases due to strong air stream force. The resulting nanofibers have poor quality.

Under insufficient laser power, as the volume of the multifilament to be fed increases, the melting rate of the resin decreases. Since the resin is not melted if the laser beam fails to reach the center of the bundle, the melted portion may shift to a lower position and some care is thus needed. In the present invention, the position of the melted portion has an effect on the shape of the vibration starting with the orifice port.

The center of the melted portion should be at 1 mm or more, preferably 3 mm or more vertically below the orifice outlet. Since the air stream lowing out the orifice is weak if the center is at a position that is too far from the orifice outlet, the center is at a position of preferably 15 mm or less, more preferably 10 mm or less, more preferably 5 mm or less to ensure vibration of the multifilament.

Figure 5:
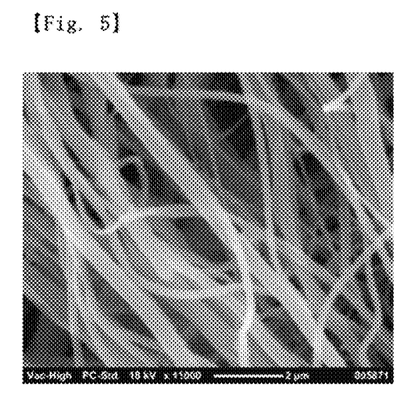
FIG. 5 illustrates nanofibers produced by the method according to the present invention.

The vibration of the multifilament, satisfying the conditions described above enables nanofibers having an average diameter of less than 1 μm to be produced without formation of shot (polymer beads), as shown in FIG. 5.

Figure 6:
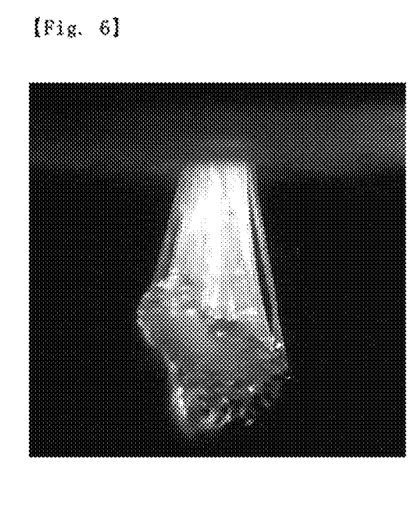
FIG. 6 illustrates a multifilament with a melted portion in the form of large lump when the multifilament did not vibrate.
Figure 7:
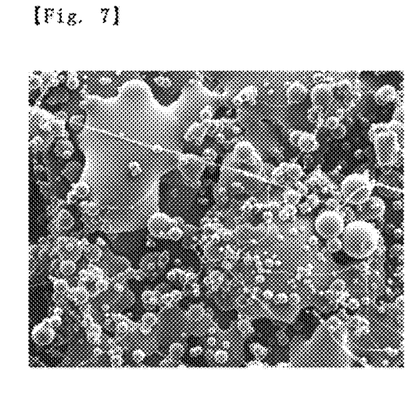
FIG. 7 illustrates deposited melted lumps when the multifilament did not vibrate.

In contrast, in the case where a multifilament is used but not vibrated, melted portions thereof fuse to each other to form large molten lumps as shown in FIG. 6. These lumps are deposited in the form of shots (polymer beads) as shown in FIG. 7, and no or a few nanofibers can be produced in some cases.

As described above, it is critical for production of nanofibers from a multifilament that the leading end of the multifilament is melted by and the multifilament is vibrated by laser beam irradiation in an ultrasonic air stream. Since satisfactory nanofibers cannot be produced from the multifilament used as an original yarn without vibration, the technique developed by the present inventors quite differs from conventional carbon dioxide gas ultrasonic laser drawing methods and vibration fills the important role in the present invention.

According to the method described above, the nanofibers or deposits thereof can be produced on the bottom of the drawing chamber or on a substrate, if disposed thereon. In the case of using a movable substrate, the deposits of the nanofibers can be continuously produced. Alternatively, in the method of the present invention, a plurality of orifices as previously described can be arrayed to produce deposits of nanofibers over a large width. For example, these orifices rare disposed in the transverse direction (TD) of the apparatus to increase the width of the deposits of nanofibers. The distance between the orifices can be appropriately determined in view of the vibration width of the multifilament so as to avoid mutual contact with multifilaments and so as not to be affected by the air streams of the adjacent orifices. In addition to the array of orifices in the TD direction, several rows of orifices may also be disposed in the machine direction (MD). Nanofibers can thereby be blown several times, resulting in production of further uniform deposits of nanofibers. In the present invention, an increase in the number of rows of orifices can further improve the throughput of the deposits.

The wide deposits of nanofibers and the substrate can be combined by thermal lamination to form a non-woven fabric. The substrate is not essential for production of non-woven fabric. Non-woven fabric can also be prepared by embossing or thermal lamination of the deposited nanofibers. The conditions for production of nanofibers prepared by the method of the present invention, the necessity of a substrate, and the type of the substrate if used can be appropriately determined without limitation depending on its use.

The non-woven fabric produced as above can be used in a variety of fields. Examples of application include wipers (wet and dry wipers), diapers, filters (air filters, liquid filters, and molecular filters), teabags, separators for various batteries, roofing, gauzes (face masks), towels, coating cloths, sanitary products, synthetic leather, waterproofing materials, insulating materials, water-absorptive sheets, masks, oil-adsorptive sheets, aseptic packaging materials, protective clothing against bacteria and radioactive materials (minimized air resistance, aerosol trap, antibiotic, and antichemical), interlining cloths, thermal insulating materials (nanotextile), capacitors, adsorbents, catalyst carriers (hydrogen storage), electromagnetic shielding materials, medical cloths (regenerative medicine supports, membranes for skin, tubes for blood vessels), engine filters, insecticidal containers, moisture permeable waterproof sheets, and sensor ground fabrics (for thermosensors, piezosensors, and biochemical sensors).

EXAMPLES

The present invention will now be described in further detail by way of Examples. These examples should not be construed to limit the present invention. The physical parameters in Examples were determined as follows:

(1) Average Diameter of Fibers:

The surfaces of the fibers produced were observed with a scanning electron microscope (JCM-5000 made by JEOL) to take photographs (magnification: ×10000). Ten photographs were selected at random and the average diameter of all the fibers in the ten photographs was determined.

(2) Vibration Angle:

The vibration was recorded with a combination of Kayence VW-6000 and a lens VH-Z50L, and the angle defined by the vertical line from the base of the multifilament bundle discharged from the orifice and a line connecting the base and the center of the multifilament bundle was determined to be a vibration angle.

Example 1

Polypropylene multifilament (570 dtex, 60 monofilament) was provided. An orifice with a rectifier having an inner diameter of 0.6 mm and a length of 1.2 mm was supplied with the multifilament at a rate of 1.5 m/min, under conditions of an orifice occupancy of 20% and a vacuum pressure in the drawing chamber of 15 kPa (pressure difference: 96 kPa). The multifilament was irradiated with a 60-W laser beam with a diameter of 3 mm such that the center of the melted portion of the multifilament was at a position 3.5 mm right below the orifice. The multifilament vibrated at a vibration angle of 32 degrees at the outlet of the orifice. Nanofibers with an average filament diameter of 310 nm were thereby produced.

Example 2

Polypropylene multifilament (760 dtex, 120 monofilament) was provided. An orifice with a rectifier having an inner diameter of 0.8 mm and a length of 1.6 mm was supplied with the multifilament at a rate of 1.5 m/min, under conditions of an orifice occupancy of 17% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament vibrated at a vibration angle of 36 degrees at the outlet of the orifice. Nanofibers with an average filament diameter of 330 nm were thereby produced.

Example 3

Polypropylene multifilament (570 dtex, 60 monofilament) was provided. An orifice with a rectifier having an inner diameter of 0.6 mm and a length of 1.2 mm was supplied with the multifilament at a rate of 0.5 m/min, under conditions of an orifice occupancy of 20% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 5 mm right below the orifice. The multifilament vibrated at a vibration angle of 25 degrees at the outlet of the orifice. Nanofibers with an average filament diameter of 310 nm were thereby produced.

Example 4

Polypropylene multifilament (760 dtex, 120 monofilament) was provided. An orifice with a rectifier having an inner diameter of 0.8 mm and a length of 1.6 mm was supplied with the multifilament at a rate of 0.5 m/min, under conditions of an orifice occupancy of 17% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 5 mm right below the orifice. The multifilament vibrated at a vibration angle of 27 degrees at the outlet of the orifice. Nanofibers with an average filament diameter of 320 nm were thereby produced.

Example 5

Polypropylene multifilament (830 dtex, 25 monofilament) was provided. An orifice with a rectifier having an inner diameter of 0.8 mm and a length of 1.6 mm was supplied with the multifilament at a rate of 1.5 m/min, under conditions of an orifice occupancy of 24% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament vibrated at a vibration angle of 31 degrees at the outlet of the orifice. Nanofibers with an average filament diameter of 320 nm were thereby produced.

Example 6

Polypropylene multifilament (570 dtex, 60 monofilament) with an equilateral-triangular cross sectional, shape was provided. An. orifice with a rectifier having an inner diameter of 0.6 mm and a length of 1.2 mm was supplied with the multifilament at a rate of 1.5 m/min, under conditions of an orifice occupancy of 20% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament vibrated at a vibration angle of 28 degrees at the outlet of the orifice. Nanofibers with an average filament diameter of 330 nm were thereby produced.

Example 7

Poly(ethylene terephthalate) multifilament (560 dtex, 96 multifilament) was provided. An orifice with a rectifier having an inner diameter of 0.6 mm and a length of 1.2 mm was supplied with the multifilament at a rate of 1.5 m/min, under conditions of an orifice occupancy of 14% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament vibrated at a vibration angle of 41 degrees at the outlet of the orifice. Nanofibers with an average filament diameter of 400 nm were thereby produced.

Example 8

Nylon 66 multifilament (560 dtex, 48 monofilaments) was provided. An orifice with a rectifier having an inner diameter of 0.6 mm and a length of 1.2 mm was supplied with the multifilament at a rate of 1.5 m/min, under conditions of an orifice occupancy of 15% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament vibrated at a vibration angle of 39 degrees at the outlet of the orifice. Nanofibers with an average filament diameter of 370 nm were thereby produced.

Example 9

Polypropylene multifilament (760 dtex, 120 monofilament) containing a Prussian blue pigment compounded therein was provided. An orifice with a rectifier having an inner diameter of 0.6 mm and a length of 1.2 mm was supplied with the multifilament at a rate of 1.5 m/min, under conditions of an orifice occupancy of 17% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament vibrated at a vibration angle of 33 degrees at the outlet of the orifice. Nanofibers with an average filament diameter of 320 nm were thereby produced. The deposits of the resulting nanofibers were uniformly bluish, indicating uniform dispersion of the Prussian blue pigment.

Example 10

Polypropylene multifilament (570 dtex, 60 monofilament) was provided. A multi-orifice unit with five orifices of the same shape each having a rectifier having an inner diameter of 0.6 mm and a length of 1.2 mm, linearly disposed at intervals of 1.5 mm was supplied with the multifilament at a rate of 1.5 m/min, under conditions of an orifice occupancy of 20% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament vibrated at a vibration angle of 32 degrees at the outlet, of the orifice. A deposit of nanofibers having a width of about 10 cm was thereby produced on a polyethylene/polypropylene composite wet type non-woven fabric used as a substrate disposed at a position 60 mm distant from the outlets of the orifices. The deposit of nanofibers and the polyethylene/polypropylene composite wet type non-woven fabric were thermally laminated at a roll temperature of 120° C. to yield a composite non-woven fabric.

Example 11

Polypropylene multifilament (1670 dtex, 50 monofilament) was provided. An orifice with a rectifier having an inner diameter of 1.0 mm and a length of 3.0 mm was supplied with the multifilament at a rate of 1.5 m/min, under conditions of an orifice occupancy of 23% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 5.0 mm right below the orifice. The multifilament vibrated at a vibration angle of 30 degrees at the outlet of the orifice. Nanofibers with an average filament diameter of 340 nm were thereby produced.

Example 12

Polypropylene multifilament (570 dtex, 60 monofilament) was provided. An orifice with a rectifier having an inner diameter of 0.6 mm and a length of 1.9 ram was supplied with the multifilament at a rate of 1.5 m/min, under conditions of an orifice occupancy of 20% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm tight below the orifice. The multifilament vibrated at a vibration angle of 28 degrees at the outlet of the orifice. Nanofibers with an average filament diameter of 320 nm were thereby produced.

Example 13

Polypropylene multifilament (570 dtex, 60 monofilament) was provided. An orifice with a rectifier having an inner diameter of 0.6 mm and a length of 3.0 mm was supplied with the multifilament at a rate of 1.5 m/min, under conditions of an orifice occupancy of 20% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament vibrated at a vibration angle of 25 degrees at the outlet of the orifice. Nanofibers with an average filament diameter of 310 nm were thereby produced.

Example 14

Polypropylene multifilament (570 dtex, 60 monofilament) was provided. An orifice with a rectifier having an inner diameter o f 0.5 mm and a length of 1.0 mm was supplied with the multifilament at a rate of 1.5 m/min, under a condition of an orifice occupancy of 32% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament vibrated at a vibration angle of 26 degrees at the outlet of the orifice. Nanofibers with an average filament diameter of 320 nm were thereby produced.

Example 15

Polypropylene multifilament (570 dtex, 60 monofilament) was provided. An orifice with a rectifier having an inner diameter of 0.6 mm and a length of 1.8 mm was supplied with the multifilament at a rate of 1.5 m/rain, under conditions of an orifice occupancy of 20% and a vacuum pressure in the drawing chamber of 8 kPa (pressure difference: 93 kPa). The multifilament was irradiated with a 60-W laser beam with a diameter of 3 mm such that the center of the melted portion of the multifilament was at a position 3.5 mm right below the orifice. The multifilament vibrated at a vibration angle of 28 degrees at the outlet of the orifice. Nanofibers with an average filament diameter of 340 nm were thereby produced.

Example 16

Polypropylene multifilament (570 dtex, 60 monofilaments) was provided. An orifice with a rectifier having an inner diameter of 0.6 mm and a length of 1.8 mm was supplied with the multifilament at a rate of 1.5 m/min, under conditions of an orifice occupancy of 20% and a vacuum pressure in the drawing chamber of 41 kPa (pressure difference: 60 kPa). The multifilament was irradiated with a 60-W laser beam with a diameter of 3 mm such that the center of the melted portion of the multifilament was at a position 3.5 mm right below the orifice. The multifilament vibrated at a vibration angle of 31 degrees at the outlet of the orifice. Nanofibers with an average filament diameter of 420 nm were thereby produced.

Example 17

Polypropylene multifilament (830 dtex, 25 multifilament) was provided. An orifice with a rectifier having an inner diameter of 0.8 mm and a length of 2.4 ram was supplied with the multifilament at a rate of 1.5 m/min, under conditions of an orifice occupancy of 18% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 7 mm right below the orifice. The multifilament vibrated at a vibration angle of 27 degrees at the outlet of the orifice. Nanofibers with an average filament diameter of 270 nm were thereby produced.

Example 18

Polyphenylenesulfide multifilament (170 dtex, 48 monofilament) was provided. An orifice with a rectifier having an inner diameter of 0.3 mm and a length of 0.6 mm was supplied with the multifilament at a rate of 0.5 m/min, under conditions of an orifice occupancy of 18% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament vibrated at a vibration angle of 20 degrees at the outlet of the orifice. Nanofibers with an average filament diameter of 450 nm were thereby produced.

Comparative Example 1

Polypropylene multifilament (570 dtex, 60 monofilament) was provided. An orifice with a rectifier having an inner diameter of 0.35 mm and a length of 0.8 ram was supplied with the multifilament at a rate of 1.5 m/min, under conditions of an orifice occupancy of 66% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament did not vibrate at the outlet of the orifice. The melted portion fell in the form of a lump and no nanofiber was produced.

Comparative Example 2

Polypropylene multifilament (220 dtex, 40 monofilament) was provided. An orifice with a rectifier having an inner diameter of 0.9 mm and a length of 1.6 mm was supplied with the multifilament at a rate of 1.5 m/min, under conditions of an orifice occupancy of 4% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament vigorously vibrated at a vibration angle of 90 degrees at the outlet of the orifice and are partially formed into nanofibers The resulting nanofibers contained a large number of shots (polymer beads). The orifice was significantly contaminated during the operation. Large contaminants fell and were partially fused with nanofibers. The resulting nanofibers had significantly low quality.

Comparative Example 3

Polypropylene multifilament (570 dtex, 60 monofilament) was provided. An orifice with a rectifier having an inner diameter of 0.6 mm and a length of 1.2 mm was supplied with the multifilament at a rate of 1.5 m/min, under conditions of an orifice occupancy of 20% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 0.7 mm right below the orifice. The multifilament vigorously vibrated at a vibration angle of 87 degrees at the outlet of the orifice and are partially formed into nanofibers. The resulting nanofibers contained a large number of shots (polymer beads). The orifice was significantly contaminated during the operation. Large contaminants fell and were partially fused with nanofibers. The resulting nanofibers had significantly low quality.

Comparative Example 4

Polypropylene multifilament (570 dtex, 60 monofilaments) was provided. An orifice with a rectifier having an inner diameter of 0.6 mm and a length of 1.2 mm was supplied with the multifilament at a rate of 1.5 m/min, under conditions of an orifice occupancy of 20% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 20 mm right below the orifice. The multifilament did not vibrate at the outlet of the orifice. The melted portion fell in the form of a lump and no nanofiber was produced.

Comparative Example 5

Polypropylene multifilament (570 dtex, 60 monofilaments) was provided. An orifice with a rectifier having an inner diameter of 0.6 mm and a length of 1.2 ram was supplied with the multifilament at a rate of 1.5 m/min, under conditions of an orifice occupancy of 20% and a vacuum pressure in the drawing chamber of 90 kPa (pressure difference: 11 kPa). The multifilament was irradiated with a 60-W laser beam with a diameter of 3 mm such that the center of the melted portion of the multifilament was at a position 3.5 mm tight below the orifice. The multifilament did not vibrate at the outlet of the orifice. The melted portion fell in the form of a lump and no nanofiber was produced.

Comparative Example 6

Polypropylene multifilament (570 dtex, 60 monofilament) was provided. An orifice with a rectifier having an inner diameter of 0.6 mm and a length of 0 mm was supplied with the multifilament at a rate of 1.5 m/min, under conditions of an orifice occupancy of 20% and a vacuum pressure in the drawing chamber of 15 kPa (pressure difference: 86 kPa). The multifilament was irradiated with a 60-W laser beam with a diameter of 3 mm such that the center of the melted portion of the multifilament was at a position 3.5 mm right below the orifice. The multifilament did not vibrate at the outlet of the orifice. The melted portion fell in the form of a lump and no nanofiber was produced.

Comparative Example 7

Polypropylene monofilament (200 µm) was provided. An orifice with a rectifier having on inner diameter of 0.4 mm and a length of 1.2 mm was supplied with the monofilament at a rate of 1.5 m/min, under a condition of an orifice occupancy of 24% and a vacuum pressure in the drawing chamber of 15 kPa (pressure difference: 86 kPa). The monofilament was irradiated with a 60-W laser beam with a diameter of 3 mm such that the center of the melted portion of the monofilament was at a position 3.5 mm right below the orifice. However, the monofilament did not vibrate at the outlet of the orifice. Since the original filament was thick, the resulting melted portion was significantly large and thus partially fell and formed large shots or beads, resulting in production of law-quality fibers. The resulting fibers had a large average diameter of 4 μm, which was not nanofibers with an average diameter of less than 1 μm even though it was thinner than the original filament.

The invention claimed is:

1. A method for manufacturing ultrafine fibers having an average fiber diameter of less than 1 μm with an apparatus including a feeder of an original filament and a drawing chamber in communication with the feeder via an orifice having an inlet and an outlet, the orifice having a pressure difference of 20 kPa or greater between the inlet and outlet by irradiating the original filament introduced from the orifice to the drawing chamber with a laser beam, the method comprising:

introducing the original filament comprising a multifilament of a bundle of 10 or more monofilaments to the drawing chamber under such a condition that the ratio S2/S1 of the total cross section S2 of the multifilament to the cross section S1 of a rectifier of the orifice is 50% or less; and irradiating the multifilament discharged from the orifice with a laser beam such that the center portion of the multifilament melted thereby is located 1 mm to 15 mm apart vertically below the outlet of the orifice to melt the leading portion of the multifilament and to cause the entire multifilament to swing at random at a maximum angle of 5 degrees to 80 degrees to the central axis of the orifice within a conical space with the apex defined by the orifice port such that the melted leading portion of the multifilament is drawn by an air stream generated by the pressure difference.

2. The method of manufacturing ultrafine fibers according to claim 1, wherein the ratio S2/S1 is in the range of 10 to 35%.

3. The method of manufacturing ultrafine fibers according to claim 1, wherein the pressure difference is 50 kPa or more.

4. The method of manufacturing ultrafine fibers according to claim 1, wherein the ratio (L/D) of the length L to the diameter D of the rectifier of the orifice is in the range of 0.1 to 100.

5. The method of manufacturing ultrafine fibers according to claim 1, wherein the original filament comprises a thermoplastic resin.

* * * * *